United States Patent [19]

Shigemasa et al.

[11] 4,132,899
[45] Jan. 2, 1979

[54] LIQUID-LEVEL DETECTOR

[75] Inventors: Junichiro Shigemasa, Yamatokoriyama; Takashi Ohno; Sadao Tachikawa, both of Nara, all of Japan

[73] Assignee: Sharp Kabushiki Kaisha, Osaka, Japan

[21] Appl. No.: 707,655

[22] Filed: Jul. 22, 1976

[30] Foreign Application Priority Data

Jul. 23, 1975 [JP] Japan .................................. 50-90652

[51] Int. Cl.² .............................................. G01N 21/26
[52] U.S. Cl. ...................................... 250/577; 73/293; 250/227
[58] Field of Search .............. 350/96 R; 250/227, 577, 250/293; 73/293; 356/133

[56] References Cited

U.S. PATENT DOCUMENTS

| 2,620,660 | 12/1952 | Goldsmith | 73/293 |
| 3,282,149 | 11/1966 | Shaw et al. | 356/133 |
| 3,683,196 | 8/1972 | Obenhaus | 250/227 |
| 3,917,410 | 11/1975 | Ulrich | 250/227 |

OTHER PUBLICATIONS

M. E. Freeman, "Liquid Level Indicator," IBM, Technical Disclosure Bull., vol. 5, No. 1, Jun. 1962.

Primary Examiner—M. Tokar
Attorney, Agent, or Firm—Birch, Stewart, Kolasch & Birch

[57] ABSTRACT

A light-emitting element and a light-responsive element are optically connected with each other through a U-shaped optical guide. An output level of the light-responsive element indicates whether the U-shaped guide is above or below the liquid-level.

1 Claim, 8 Drawing Figures

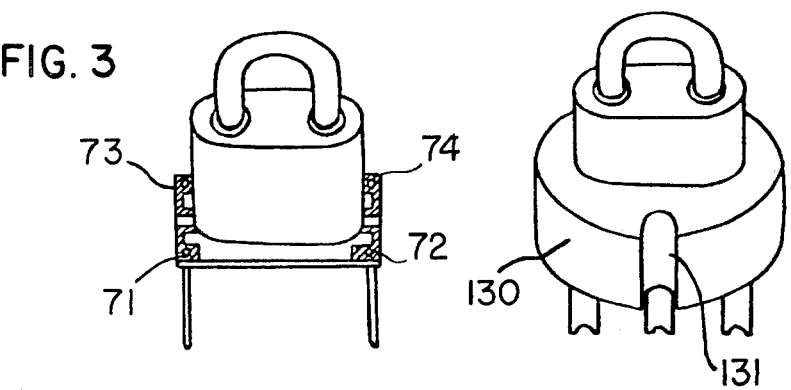
FIG. 3
FIG. 1
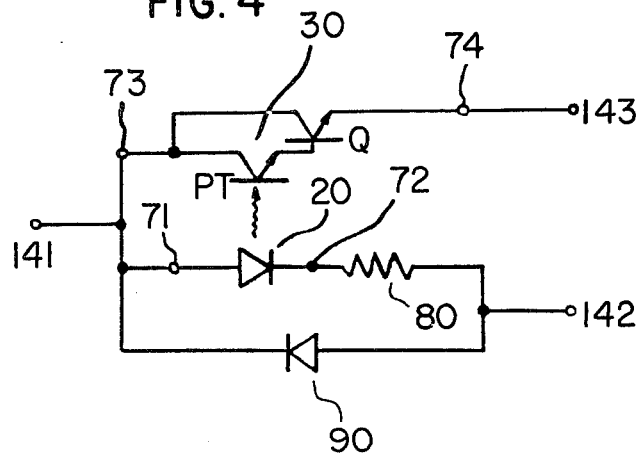
FIG. 4
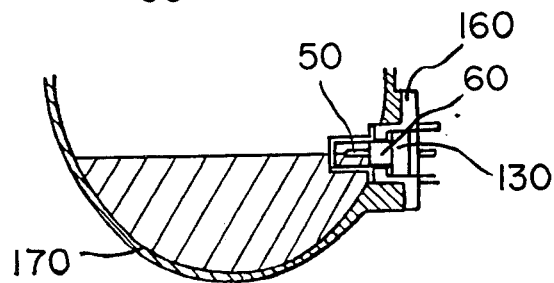
FIG. 5

LIQUID-LEVEL DETECTOR

BACKGROUND AND SUMMARY OF THE INVENTION

The present invention relates to a liquid-level detector and, more particularly, to an optoelectronic liquid-level detector.

An object of the present invention is to provide a liquid-level detector of high reliability.

Another object of the present invention is to provide a liquid-level detector of compact size and light weight.

Still another object of the present invention is to provide a liquid-level detector not having a mechanical portion.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a light-emitting element and a light-responsive element are mounted on a surface of a substrate. A U-shaped optical guide is disposed above the substrate in such a manner to optically connect the light-emitting element and the light-responsive element with each other. When the U-shaped optical guide is above the liquid-level, or, the U-shaped optical guide is positioned in air, the light-responsive element develops an output signal above a predetermined level. Contrarily, when the U-shaped optical guide is below the liquid-level, or, the U-shaped optical guide is dipped within liquid, the output level of the light-responsive element is below the predetermined value because the index of refraction of the material surrounding the U-shaped optical guide varies.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a perspective view of an embodiment of a liquid-level detector of the present invention;

FIG. 3 is a perspective view of an essential part of the liquid-level detector of FIG. 1;

FIG. 4 is a circuit diagram of an embodiment of a detection circuit associated with the liquid-level detector of the present invention;

FIG. 5 is a cross-sectional view showing an operation mode of the liquid-level detector of the present invention;

DESCRIPTION OF THE PREFERRED EMBODIMENTS

Referring now in detail to the drawings, and to facilitate a more complete understanding of the present invention, an embodiment of an oil gauge employing a liquid-level detector of the present invention will be described. This oil gauge is applicable to detect the amount of the engine oil in an automobile.

Figure 2:
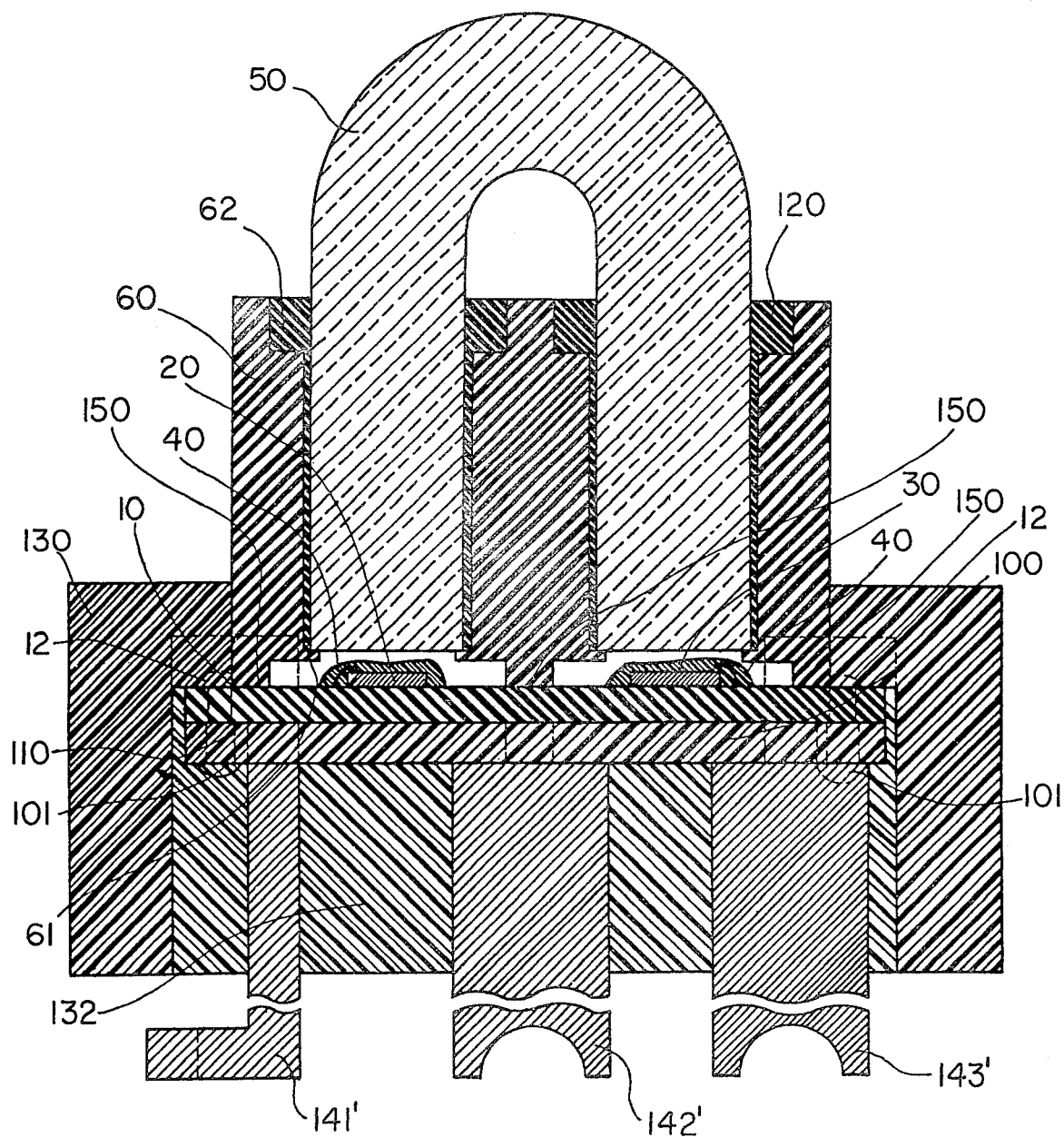
FIG. 2 is a cross-sectional view of the liquid-level detector of FIG. 1.

FIGS. 1 through 3 show an embodiment of an oil gauge of the present invention.

A wiring pattern made of an alloy of silver and palladium is formed on a substrate 10 made of ceramics through the use of screen printing techniques. A light-emitting element 20 and a light-responsive element 30 made of, for example, phototransistors connected in a Darlington fashion are mounted on the substrate 10 and connected to the wiring pattern through the use of a bonding technique. The wiring at the bonding area is preferably made of an alloy of gold and palladium. Upper surfaces of the elements 20 and 30 are pre-coated with silicone resin 40 after completion of the bonding treatment in order to fix the bonding area and to stabilize the element surface.

Light emitted from the light-emitting element 20 is introduced into a U-shaped optical guide 50 made of glass and conducted to the light-responsive element 30 through the guide 50. The U-shaped optical guide 50 can be easily fabricated by bending a round glass bar through the use of thermal treatment.

The U-shaped optical guide 50 is supported by a cover 60 made of ceramics so that the light-emitting element 20 and the light-responsive element 30 are optically shielded from each other and also shielded from ambient light. A preferred size of the U-shaped optical guide 50 is 3.0 mm$\phi$ ($\pm 0.2$ mm) and, therefore, the cover 60 is constructed so that it has two through holes of 3.2 mm$\phi$ ($+$ 0.2 mm, $-$ 0) inside diameter, through which the U-shaped optical guide 50 is inserted. At the bottom edges of the through holes, projections 61 are formed to determine the bottom edge of the U-shaped optical guide 50, and indents 62 are formed at the top edges of the through holes in order to facilitate the insertion of the U-shaped optical guide 50.

The cover 60 is adhered to the substrate 10 through the use of an epoxy film 150 such as "NITTO E.P.S." manufactured by Nitto Electric Industrial Co., Ltd., Japan, and "KYOCERA SEALER" manufactured by Kyoto Ceramic Co., Ltd., Japan.

The above-described portion is called a head. FIG. 3 is a perspective view of the head. Respective terminals of the light-emitting element 20 and the light-responsive element 30 are electrically connected to terminals 71, 72, 73 and 74 formed on the substrate 10 via the wiring pattern formed on the substrate 10.

FIG. 4 shows a typical circuit construction associated with the light-emitting element 20 and the light-responsive element 30. A protective resistor 80 and a protective diode 90 are externally connected to the light-emitting element 20. These resistor 80 and diode 90 are mounted on a printed board 100 made of epoxy resin which is disposed behind the substrate 10. Electrical connection between the upper surface of the substrate 10 and the rear surface of the printed board 100 is achieved through connection pins 110 made of kovar, and the solderings 12 and 101 at the terminals 71, 72, 73 and 74.

Adhesion 120 is filled in the clearance formed between the U-shaped optical guide 50 and the cover 60 from the indents 62 to tightly support the U-shaped optical guide 50. The adhesion 120 can be made of silicone resin and, more preferably, made of low melting glass frit. A little toner is mixed with the low melting glass frit to color the adhesion 120, and iron oxide and chromium are also mixed with the glass frit, which act as buffers for the thermal shock.

Thus formed device is disposed in a casing 130 made of phenol resin. Two idents 131 are formed on the side wall of the casing 130 for facilitating installation. Three terminal pins 141', 142' and 143' are extruded from the bottom surface of the casing 130, respective of which are connected to a power supply terminal 141 (+ 12V), a grounded terminal 142, and an output terminal 143 shown in FIG. 4. The clearance 132 formed in the casing 130 is filled with protective resin made of, for example, epoxy resin.

The automobile engine usually operates at the temperature from 70° C. to 80° C. The temperature will rise to near 150° C. when the engine is accidentally over heated on a hot day. Therefore, the oil gauge of the present invention is constructed so that the head portion, which is positioned directly in the engine chamber, can tolerate a high temperature of 170° C., and the remaining portion can tolerate a high temperature of 150° C.

The permissible maximum temperature of the respective elements is selected as follows:

HEAD PORTION

Ceramics (substrate 10 and cover 60): above 1000° C.
epoxy film 150: 170° C.
glass 50 and low melting glass frit 120: above 400° C.
silicone resin 40 for pre-coat: 200° C.

REMAININGS casing 130: 150° C.
epoxy resin for filling the clearance 132: 150° C.

Moreover, the glass 50 and the low melting glass frit 120 are chemically stable against an organic solvent such as the engine oil.

The above-mentioned oil gauge is fixed to an oil pan 170 with the use of a supporter 160 in such a manner that only the head portion comes into contact with the engine oil as shown in FIG. 5.

Figure 6:
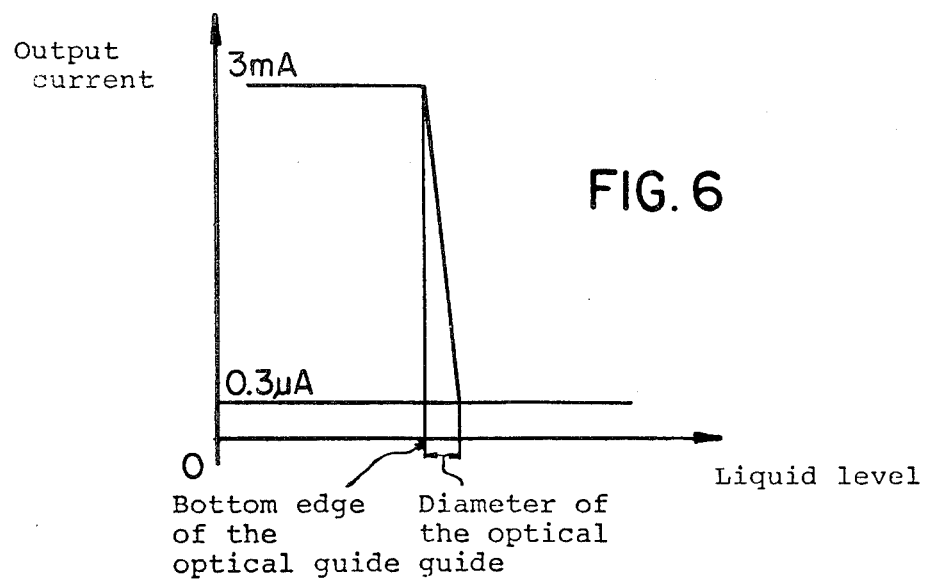
FIG. 6 is a graph showing output current versus liquid-level characteristics of a light-responsive element employed in the liquid-level detector of the present invention.

The output signal level from the output terminal 143 varies in response to the oil-level in the oil pan 170 as shown in FIG. 6. That is, the signal level shows whether the U-shaped optical guide 50 is above or below the oil-level. In the foregoing embodiment, the light-responsive element 30 comprises a phototransistor PT and a transistor Q, which are connected with each other in a Darlington fashion.

Figure 7:
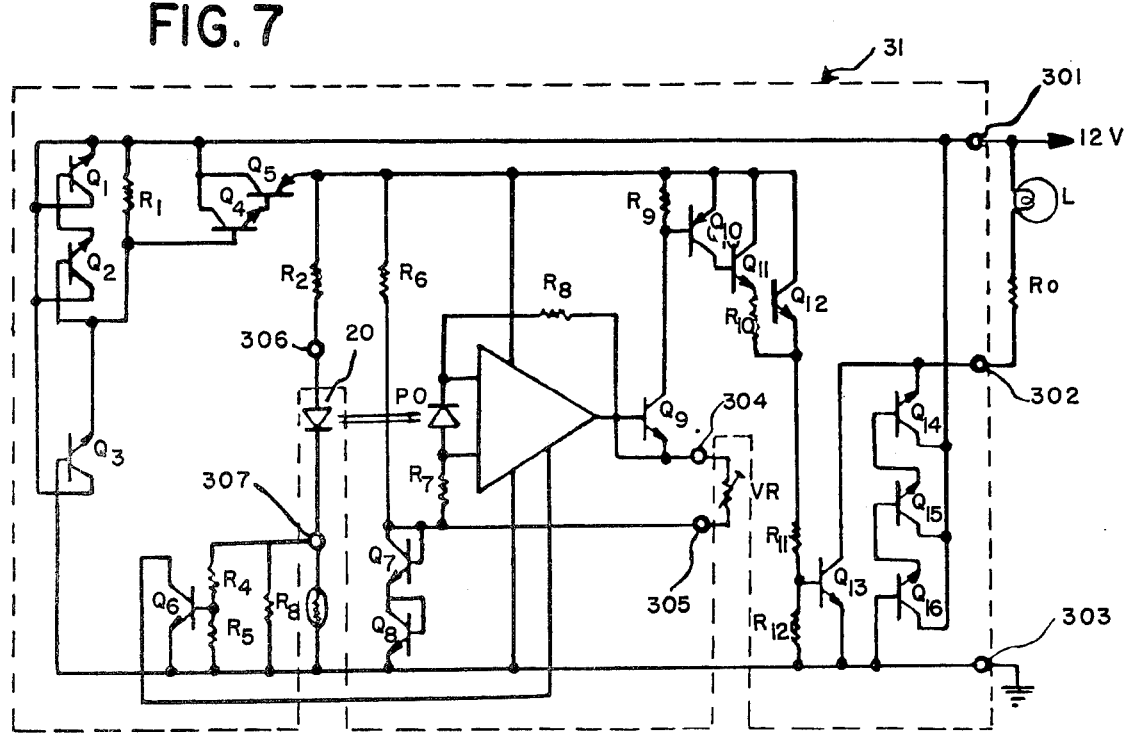
FIG. 7 is a circuit diagram of another embodiment of a detection circuit associated with the liquid-level detector of the present invention.
Figure 8:
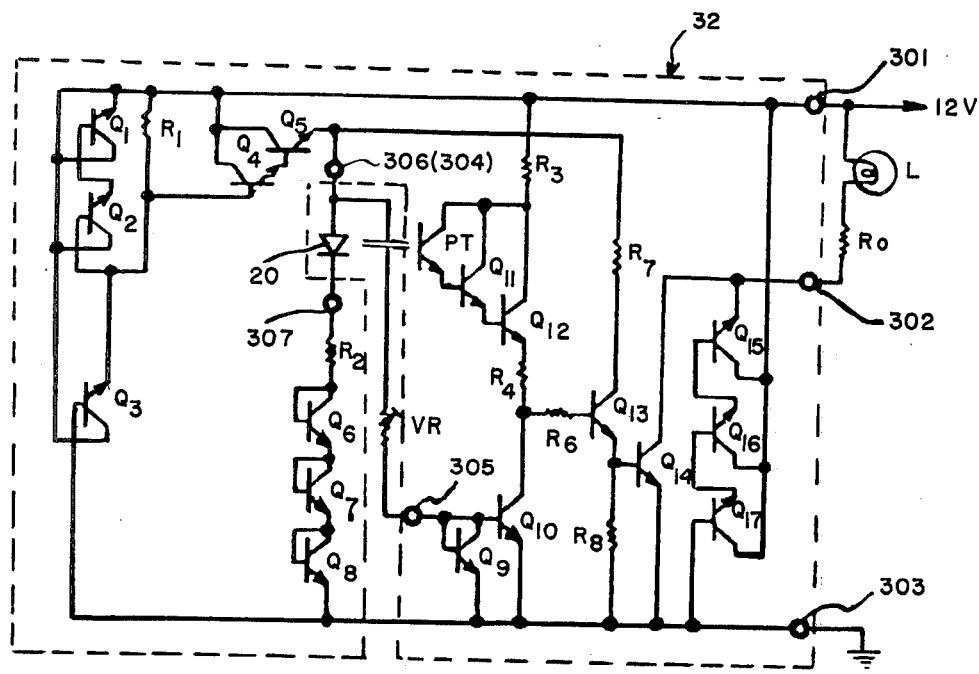
FIG. 8 is a circuit diagram of still another embodiment of a detection circuit associated with the liquid-level detector of the present invention.

FIGS. 7 and 8 show other embodiments of the light-responsive means, wherein the amplifying function is given to the light-responsive means, and a lamp L is connected between a power supply terminal 301 and a signal output terminal 302 to indicate a dangerous liquid-level. FIG. 7 shows an embodiment of the light-responsive means 31 employing a photodiode PD, and FIG. 8 shows an embodiment of the light-resonsive means 32 employing a phototransistor PT. In these drawings, 303 is a grounded terminal, 304 and 305 are terminals for a variable resistor VR, and 306 and 307 are terminals for a light-emitting diode 20.

Wirings are formed on the substrate 10 for connecting the light-emitting element 20 to terminals 306 and 307. A resistor Ro is provided for preventing an accidental current flowing through the lamp L. The variable resistor VR is externally connected to the circuit in order to compensate for the variation of the characteristics of the elements included within the circuit.

The above-mentioned liquid-level detector can be also applied to detect the liquid-level of the water filled in the radiator. Moreover, the liquid-level detector of the present invention can be applied to detect the liquid-level of the brake oil, the clutch oil, the window washer and the liquid filled in the battery carried in the automobile. Further, the present liquid-level detector can be applied to some kinds of vending machines, such as the noddle vender and the coffee vender, containing liquid therein.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid level meter comprising:
   a light-emitting diode and a phototransistor pair connected in a Darlington configuration mounted on the same surface of a common substrate;
   a U-shaped optical guide for conducting light emitted from said light-emitting diode to said phototransistor pair, the amount of light reaching the light-responsive element being proportional to the index of refraction of the material surrounding the optical guide, said optical guide being supported on said substrate so that the ends of said U-shaped optical guide face the light-emitting element and the light-responsive element, respectively, said U-shaped optical guide defining a plane disposed parallel to the plane of the top surface of the liquid, the level of which is being detected;
   a ceramic cover extending from said substrate and surrounding a portion of said U-shaped optical guide, said cover optically shielding said light-emitting photodiode and phototransistor optical pair from each other across said substrate surface and from ambient light, said ceramic cover also shielding said photodiode and phototransistor Darlington pair from ambient heat;
   a power source for supplying a constant current to said light-emitting photodiode; and
   means for detecting a variation of an output signal of said phototransistor optical pair.

* * * * *